United States Patent [19]

Morikawa

[11] Patent Number: 4,704,996

[45] Date of Patent: Nov. 10, 1987

[54] SYSTEM FOR CONTROLLING THE INTAKE AIR OF AN AUTOMOTIVE ENGINE

[75] Inventor: Koji Morikawa, Naritahigashi, Japan

[73] Assignee: Fuji Jukogyo Kabushiki Kaisha, Tokyo, Japan

[21] Appl. No.: 820,868

[22] Filed: Jan. 21, 1986

[30] Foreign Application Priority Data

Jan. 22, 1985 [JP] Japan .................................. 60-10278

[51] Int. Cl.⁴ ............................................ F02B 31/00
[52] U.S. Cl. .............................. 123/188 M; 123/52 M; 123/306
[58] Field of Search ............... 123/188 M, 52 M, 308, 123/432, 306

[56] References Cited

U.S. PATENT DOCUMENTS

| | | | |
|---|---|---|---|
| 4,480,606 | 11/1984 | Kato et al. | 123/188 M |
| 4,519,355 | 5/1985 | Fujimura et al. | 123/188 M |
| 4,550,699 | 11/1985 | Okumura et al. | 123/188 M |

Primary Examiner—Ira S. Lazarus
Attorney, Agent, or Firm—Martin A. Farber

[57] ABSTRACT

A deflector plate is pivotally mounted in an intake passage of an engine so as to reduce the cross-sectional area of the intake passage, and an actuator is provided for operating the deflector plate. A control unit is provided for operating the actuator so that the deflector plate operates to reduce the cross-sectional area of the intake passage to increase the swirl ratio of the intake air as the combustion condition deteriorates.

7 Claims, 7 Drawing Figures

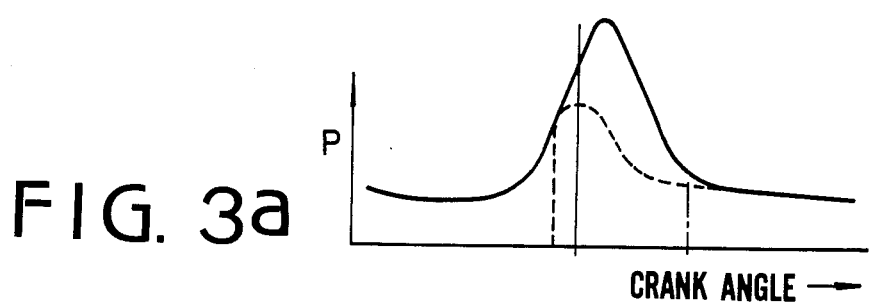
FIG. 3a
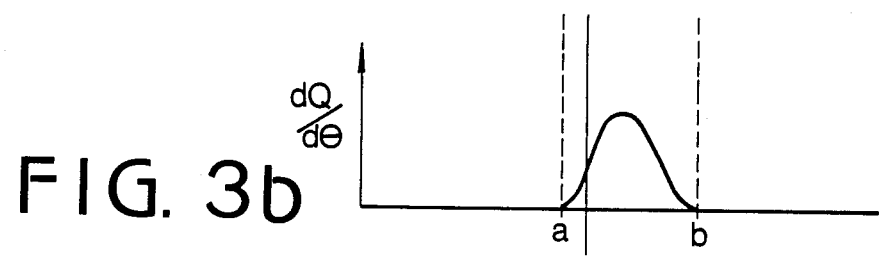
FIG. 3b
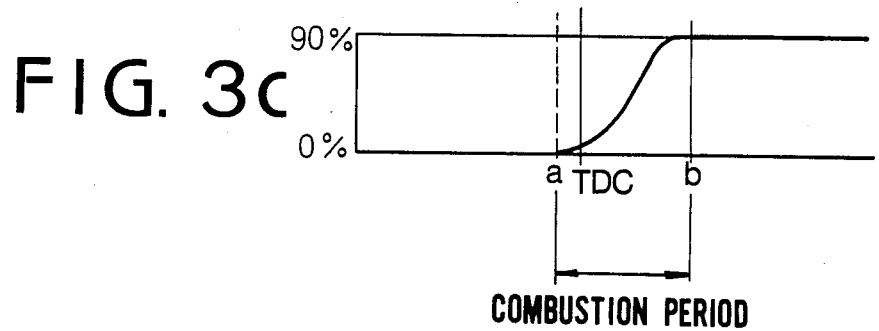
FIG. 3c
FIG. 4
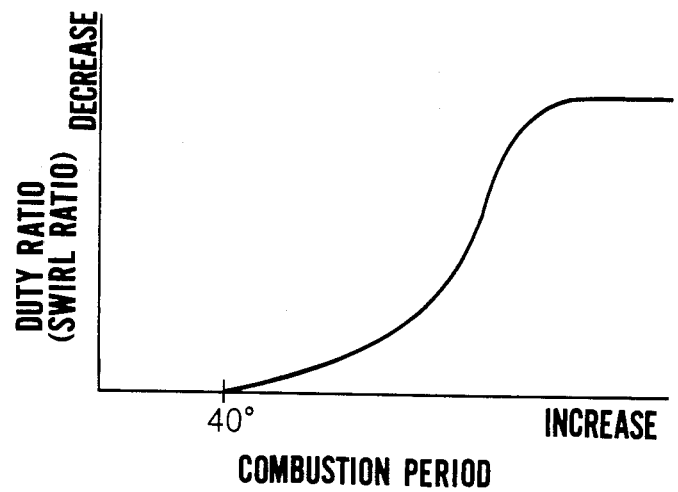

SYSTEM FOR CONTROLLING THE INTAKE AIR OF AN AUTOMOTIVE ENGINE

BACKGROUND OF THE INVENTION

The present invention relates to a system for controlling the intake air for an automotive engine, and more particularly to a system for controlling swirling of the intake air in a combustion chamber of the engine.

In order to improve the combustion efficiency and fuel consumption of an automotive engine, the engine is constructed to cause the induced air to swirl in the combustion chamber. The swirling can be generated, for example, by disposing an intake port in a cylinder head in the tangential direction with respect to the corresponding cylinder. In conventional swirl generating means, swirl ratio (rotational speed of swirl/engine speed) is set to a constant value irrespective of driving conditions of a vehicle. Assuming that the swirl ratio is set at a value proper for a middle load on an engine between light and heavy loads, the swirl at the set swirl ratio is insufficient for a light load, and excessive for a heavy load. Accordingly, by such constant swirl generating means, fuel consumption is not improved because the combustion deteriorates caused by the insufficient swirl ratio and the cooling loss increases caused by a high swirl ratio.

Japanese Utility Model Laid Open No. 56-142227 discloses a control system in which a deflector plate is provided in an intake port. The disposition of the deflector plate is adapted to be changed in angle with respect to the axis of the intake port in accordance with engine operating conditions such as load and engine speed, so that the above-described deficiency may be eliminated. However, the system can not improve the combustion efficiency in particular operating conditions such as transient state, high EGR rate and others.

SUMMARY OF THE INVENTION

The object of the present invention is to provide a system which may properly control the swirl of the intake air in accordance with combustion conditions of an engine, thereby improving fuel consumption and driveability of a vehicle.

The system of the present invention is provided with a deflector plate provided in an intake passage of an engine so as to reduce the cross-sectional area of the intake passage, and a vacuum operated actuator for operating the deflector plate. The system comprises sensors provided for detecting combustion condition of the engine and for producing an output signal dependent on the combustion condition, and a control unit provided to respond to the output signal for operating the actuator so that the deflector plate operates to reduce the cross-sectional area of the intake passage to increase the swirl ratio as the combustion condition deteriorates.

The other objects and features of this invention will become understood from the following description with reference to the accompanying drawings.

BRIEF DESCRIPTION OF DRAWINGS

FIG. 3a is a graph showing pressure in a combustion chamber;
FIG. 3b is a graph showing heat generating rate;
FIG. 3c is a graph showing combustion rate;
FIG. 4 is a graph showing the relationship between combustion period and duty ratio for controlling the swirl ratio.

DETAILED DESCRIPTION OF THE PREFERRED EMBODIMENT

Figure 1:
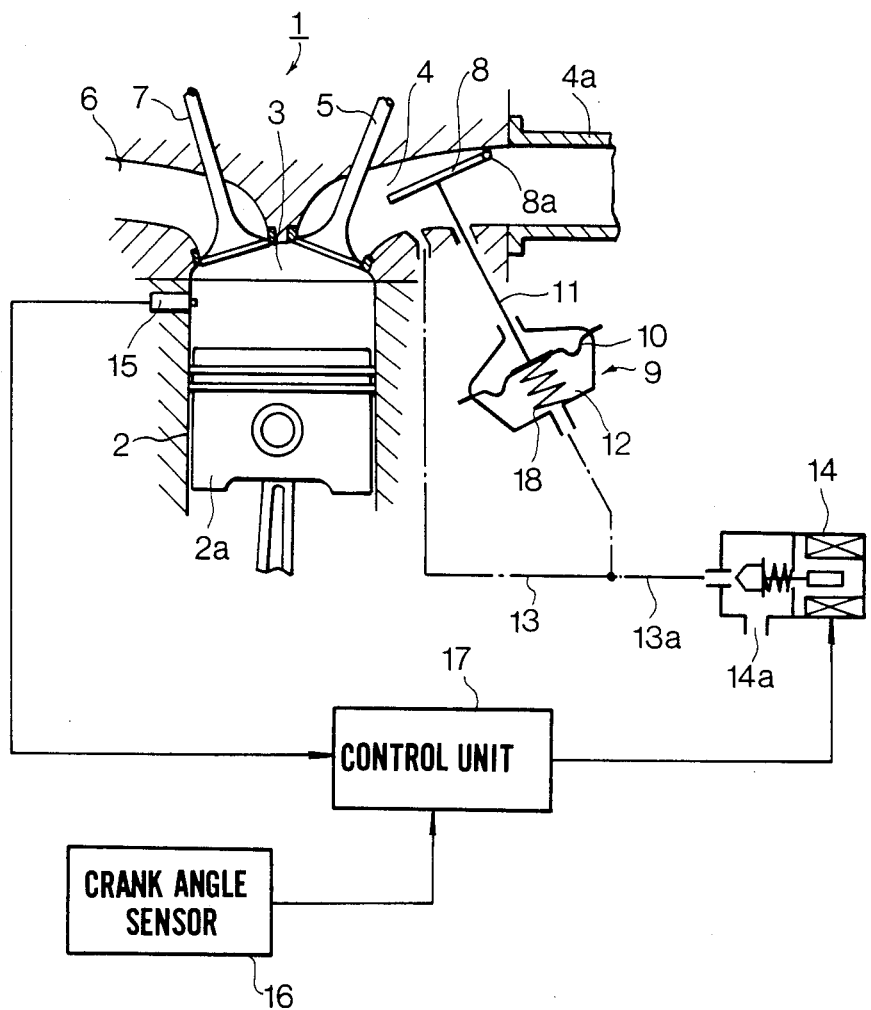
FIG. 1 is a schematic diagram showing a control system according to the present invention.

Referring to FIG. 1, an automotive engine 1 has a combustion chamber 3 defined by a cylinder 2 and a piston 2a, an intake valve 5 for an intake port 4 and an exhaust valve 7 for an exhaust port 6. The intake port 4 is disposed in the tangential direction with respect to the combustion chamber 3 so as to swirl the induced air entering the combustion chamber 3. A deflector plate (vane) 8 is provided in the intake port 4 so as to be pivoted about a shaft 8a. The deflector plate 8 is operatively connected to a diaphragm 10 of a vacuum operated actuator 9 by a rod 11. A vacuum chamber 12 of the actuator 9 is communicated with the intake port 4 downstream of the deflector plate 8 through a passage 13. The chamber 12 is further communicated with the atmosphere through a passage 13a and a drain port 14a of a solenoid operated valve 14. The deflector plate 8 may be provided in an intake pipe 4a.

A pressure sensor 15 is provided in the cylinder 2 to detect the pressure in the combustion chamber 3, and a crank angle sensor 16 is provided to detect the angle of the crankshaft of the engine. Outputs of the sensors 15 and 16 are applied to a control unit 17 having a microcomputer. The control unit is adapted to produce output pulses for operating the solenoid operated valve 14.

Figure 2:
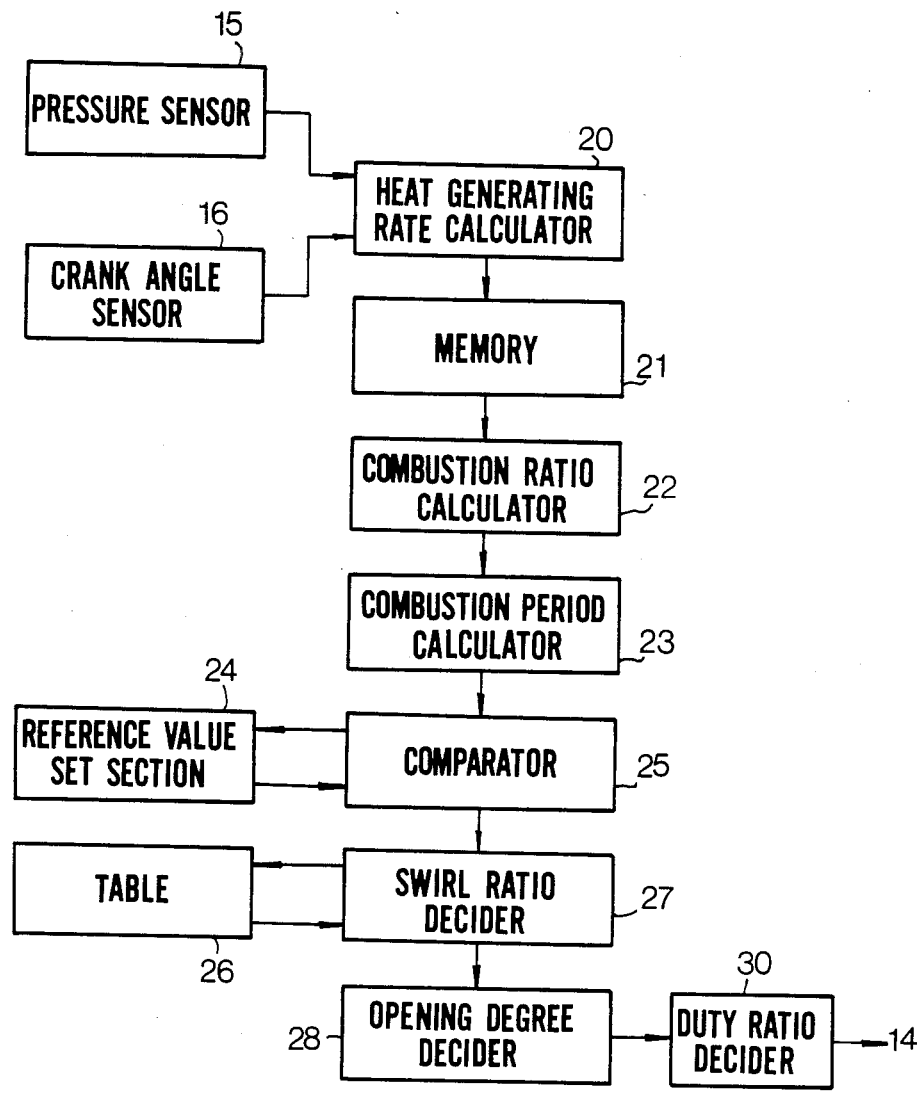
FIG. 2 is a block diagram showing a control unit in the system of FIG. 1.

FIG. 2 shows a block diagram of the control unit 17. The system comprises a heat generating rate calculator 20 applied with output signals of the pressure sensor 15 and crank angle sensor 16, a memory 21 for storing the heat generating rate in one cycle of the engine, a calculator 22 for calculating combustion ratio in the one cycle from the heat generating rate stored in the memory 21, and a calculator 23 for calculating combustion period from the combustion ratio.

FIG. 3a shows the combustion pressure in the cylinder 2 by a solid line and pressure at motoring (without combustion) by dotted line. The motoring pressure can be calculated, for example, based on the pressure of air-fuel mixture at a compression starting point. The heat generating rate can be obtained from the motoring pressure and actual combustion pressure. However, the heat generating rate $dQ/d\theta$ can also be obtained by a simple calculation in accordance with the following formula, $$dQ/d\theta = (A/K-1)(V(dP/d\theta) K P(dV/d\theta))$$

where P is the combustion pressure in the combustion chamber, V is the volume of the combustion chamber with respect to the crank angle $\theta$, K is specific heat, and A is mechanical equivalent of heat. The heat generating rate in one cycle (FIG. 3b) is stored in the memory 21.

Further, the combustion rate X (FIG. 3a) is calculated from the heat generating rate $dQ/d\theta$ by the following formula.

$$X = \sum_a^i dQ / \sum_a^b dQ$$

where a is a combustion starting point and b is a combustion finishing point.

By calculating a period between predetermined combustion rates, for example between 0% and 90%, the combustion period can be obtained. The heat generating rate is shown in FIG. 3b and the combustion period is shown in FIGS. 3b, and 3c.

On the other hand, an optimum combustion period with respect to fuel consumption (for example 40 degrees in crank angle) is previously obtained and the period is set in a reference value set section 24. The calculated actual combustion period is compared with the optimum period at a comparator 25. The control unit 17 is so arranged that when the actual combustion period is shorter than the optimum period, the duty ratio of the output pulses of the control unit 17 is increased to increase the amount of air draining from the valve 14. FIG. 4 shows the relationship between the duty ratio and the actual combustion period. The data for the duty ratio is stored in a table 26. The swirl ratio is decided at a swirl ratio decider 27 in accordance with the result of the comparison. Further, the opening degree of the deflector plate 8 is decided at an opening degree decider 28 in accordance with the swirl ratio. From the swirl ratio, the duty ratio is decided at a duty ratio decider 30.

When combustion is performed with a high efficiency, the actual combustion period becomes smaller than the optimum period. Accordingly, output pulses having a large duty ratio are applied to the solenoid operated valve 17 to increase the amount of draining air. Thus, the diaphragm 10 of the actuator 9 is deflected by a spring 18 to push the rod 11, so that the deflector plate 8 is rotated clockwise to increase the cross-sectional area of the intake port (opening degree of the deflector plate). Accordingly, the speed of intake air decreases thereby reducing the swirl ratio.

Figure 5:
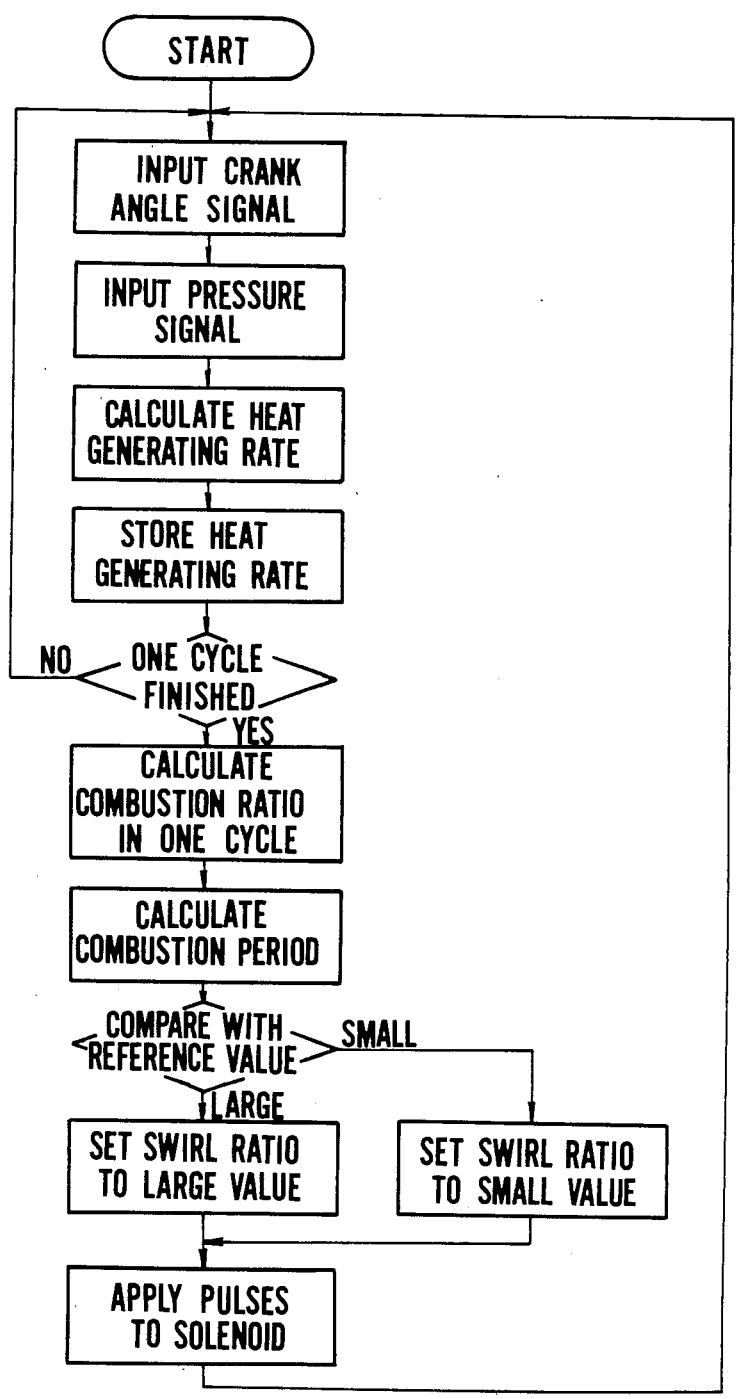
FIG. 5 is a flowchart showing the operations of the system.

When combustion is poor because of low engine speed, transient state, high EGR rate and other features, the actual combustion period becomes longer than the optimum period. Accordingly, the duty ratio of the pulses decreases, so that the diaphragm 10 is deflected in reverse by the vacuum in the intake port 4 to rotate the deflector plate 8 so as to reduce the cross-sectional area of the intake port. Thus, the speed of the intake air increases, which increase the swirl ratio, thereby increasing the combustion efficiency. FIG. 5 shows the above described operation.

Although, in the above-described embodiment, the combustion period is used for deciding the combustion condition, the pressure rising rate dP/dθ may also be used for the detection of the condition.

From the foregoing, it will be understood that the swirl ratio is controlled in accordance with combustion conditions, so that combustion efficiency can be improved.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A system for controlling intake air of an automotive engine, comprising:

a swirl intake passage inducing air into a combustion chamber of the engine and disposed so as to swirl the air induced into the combustion chamber of the engine;

a deflector plate provided in the swirl intake passage so as to vary the cross-sectional area of the swirl intake passage to control swirl ratio;

actuator means for operating the deflector plate;

detecting means for detecting a combustion condition of the engine and for producing an output signal dependent on the combustion condition; and control means responsive to the output signal for producing an output for operating the actuator means so that the deflector plate operates to reduce the cross-sectional area of the swirl intake passage to increase the swirl ratio when the combustion condition deteriorates.

2. The system according to claim 1 wherein the deflector plate is pivotally mounted in an intake port of the engine.

3. The system according to claim 1 wherein the actuator means comprises a vacuum operated actuator having a diaphragm and a vacuum chamber communicated with the intake passage, and a solenoid operated valve provided for draining the vacuum chamber.

4. The system according to claim 3 wherein the output of the control means is in the form of pulses.

5. The system for controlling the intake air of an automotive engine according to claim 1, wherein said swirl intake passage is the sole passage providing air into said combustion chamber.

6. A system for controlling intake air of an automotive engine, comprising:

an intake passage inducing air into a combustion chamber of the engine and disposed so as to swirl the air induced into the combustion chamber of the engine;

a deflector plate movably mounted in the intake passage so as to vary a cross-sectional area of the intake passage to control swirl ratio;

actuator means for moving the deflector plate;

detecting means for detecting a combustion condition of the combustion chamber and for producing an output signal dependent on the combustion condition; and control means responsive to the output signal for operating the actuator means so that the deflector plate moves to reduce the cross-sectional area of the intake passage to increase the swirl ratio when the combustion condition deteriorates.

7. A system for controlling intake air of an automotive engine, comprising an intake passage comprising an intake pipe and an intake port extending from said intake pipe to a combustion chamber of the engine, said intake passage being arranged so as induce the intake air with swirl into said combustion chamber of the engine, a deflector plate moveably disposed in the intake passage so as to change a cross-sectional area of the intake passage to control swirl ratio, actuator means for moving the deflector plate, detecting means for detecting a combustion condition comprising pressure in the combustion chamber and crank angle of the engine, control means responsive to the detecting means for operating the actuator means so that the deflector plate moves to reduce the cross-sectional area of the intake passage to increase the swirl ratio when the combustion condition deteriorates.

* * * * *